United States Patent

Konrad et al.

Patent Number: 6,020,827
Date of Patent: Feb. 1, 2000

[54] AUTHENTICATION DEVICE WITH KEY NUMBER MEMORY

[75] Inventors: Reimund Konrad, Gummersbach; Wilfried Petsching, Wipperfürth; Bernd Weiss, Gummersbach, all of Germany

[73] Assignee: F&G Megamos Sicherheitselektronik GmbH, Wiehl, Germany

[21] Appl. No.: 08/869,059

[22] Filed: Jun. 4, 1997

[30] Foreign Application Priority Data

Jun. 6, 1996 [DE] Germany .............. 196 22 720

[51] Int. Cl.$^7$ ........................................ H04Q 1/00
[52] U.S. Cl. ................ 340/825.31; 340/825.54; 70/278
[58] Field of Search ............... 341/825.31, 825.34, 341/825.69, 825.72, 825.54; 70/278; 235/382

[56] References Cited

U.S. PATENT DOCUMENTS

| | | | |
|---|---|---|---|
| 4,509,093 | 4/1985 | Stellberger | 340/825.31 |
| 5,523,746 | 6/1996 | Gallagher | 340/825.31 |
| 5,552,789 | 9/1996 | Schuermann | 340/825.31 |
| 5,724,028 | 3/1998 | Prokup | 340/825.31 |

*Primary Examiner*—Brian Zimmerman
*Attorney, Agent, or Firm*—Proskauer Rose LLP

[57] ABSTRACT

The invention relates to a device for checking the user authorisation for access control devices, in particular locking devices for vehicles. The information emitted by the respective transponder (T1 ... Tn) in key devices (B1 ... Bn) in each case is compared to preset information, fixed by the secret code, in the control device, relevant for the respective key device (B1 ... Bn), whereby (a) the relevant secret code for the respective key device (B1 ... Bn) is stored, by learning it from the control device (A);

(b) the information emitted by the respective transponder (T1 ... Tn) comprises user code information encoded according to the learned secret code;

(c) the control device (A) comprises a further memory means (M) in which the number of the key devices (B1 ... Bn) taught by the control device (A) is stored; and (d) the key devices (B1 ... Bn) comprise further memory means (M1 ... Mn) into which the actual memory value of the further memory means (M) in the control device (A) is taken over at each contact between the respective key device (B1 ... Bn) and the control device (A).

6 Claims, 1 Drawing Sheet

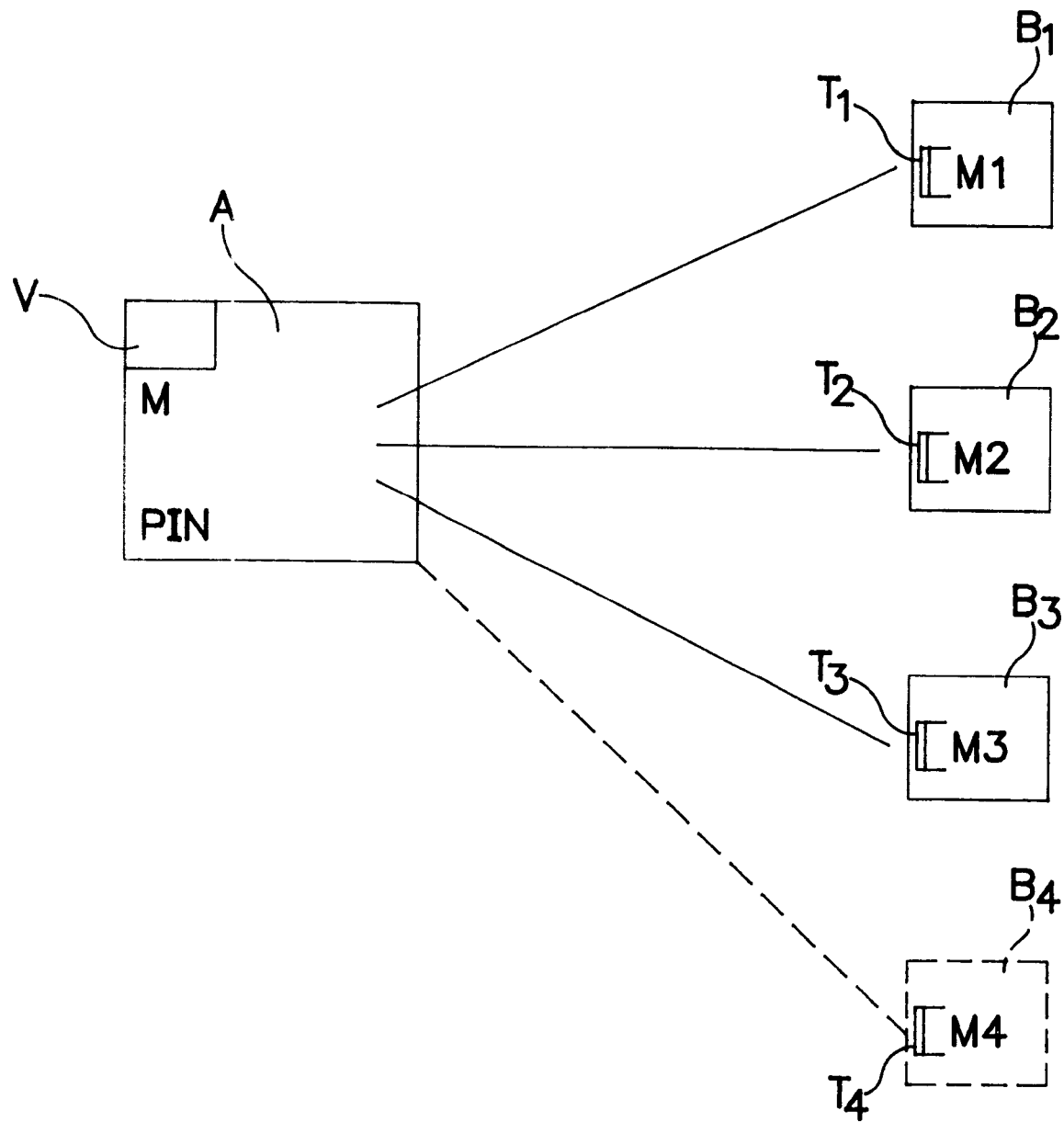

AUTHENTICATION DEVICE WITH KEY NUMBER MEMORY

The invention relates to a device for checking the user authorisation for-access control devices, in particular locking devices for vehicles.

Particularly in recent years, locking devices for vehicles have assumed an even higher significance as a result of a drastic increase in vehicle thefts. In connection with so-called keyless car systems, key devices are increasingly used which are intended to replace the traditional vehicle keys so easy to manipulate.

Modern key devices comprise a transponder coupled to a chip as a central element. During electromagnetic excitation, the said transponder emits user code information, for example in the form of a numerical sequence.

The control device then compares whether or not the user code information emitted by the transponder in the key device indicates an authorised user. Only when the authorised user is identified, does the control device release access to the downstream components of the vehicle; otherwise access to operating the vehicle is blocked. In order to identify the user of the respective key device as being authorised, the control device emits a secret code to the key device in a so-called "teaching process". Thus, after teaching the complete set of vehicle keys which were issued to the user at the time of vehicle handover, each key is characteristic for the authorised vehicle user.

Such devices are for example known from DE 4317119 C2 and DE 4435894 A1.

In connection with vehicle thefts, misuse has been observed insofar as the control device of the vehicle teaches further keys, in addition to the lawfully obtained and taught vehicle keys. To be sure, in the case of a feigned vehicle theft, although a complete key set is handed over to the insurer, nevertheless it is possible to operate the allegedly stolen vehicle with the keys subsequently taught.

It is therefore the object of this invention to further develop a device for checking the user authorisation for access control devices, in particular locking devices for vehicles, to the extent that the above-mentioned abuse is prevented.

The invention is characterized by a device for checking the user authorisation for access control devices, in particular locking devices for vehicles, comprising a control device on the access side with a memory means for a secret code;

a number of key devices on the user side, each containing a transponder in which the relevant secret code for the particular key device is stored; and comparison means in the control device for determining the authorisation required for releasing the access device, in such a way that the information emitted by the respective transponder in each case is compared to preset information, fixed by the secret code, in the control device, whereby (a) the relevant secret code for the particular key device is stored, by learning it from the control device;

(b) the information emitted by the respective transponder—which is compared by the comparison means in the control device with the preset information fixed in the control device, so as to determine the authorisation required for releasing the access device— comprises user code information encoded according to the taught secret code;

(c) the control device comprises a further memory means in which the number of the key devices taught by the control device is stored; and (d) the key devices comprise further memory means into which the actual memory value of the further memory means in the control device is taken over at each contact between the respective key device and the control device.

The means of the invention makes it possible to determine how many key devices have been taught by the same control device. The numeric value of the memory located in the vehicle is read into the further memory present in the respective key, so that the current value corresponding to the number of taught keys has or has not been handed over to at least one of the "lawful" key devices. In the latter case, insurance fraud is suspected.

Preferred embodiments of the invention can be seen from the dependent claims. In this it is particularly advantageous if the memory in the control device is an increase-only counter, which is increased by one counter impulse, so that manipulation of the memory, regarded in isolation, is impossible. In case the counter receives an additional impulse for the very purpose of decreasing its value so as to disguise an additionally-taught key, according to this modification of the invention, nevertheless a forced increase of the counter occurs as a result of the additional impulse. The number that can be seen from the further memory is thus always at least equal to the total number of keys taught, so that it is possible in each case to detect whether more than the number of keys handed over have been taught.

A further preferred embodiment provides for the ability to allocate PIN codes both to the control device and to the respective key devices, in such a way that it is only possible to set the further memory means in the control device if the PIN code entered in the key device agrees with the PIN code stored in the control device.

This signifies an additional improvement in security, because a teaching process of the key can only take place at all if the PIN code relevant for the control device is entered into the key. This measure in itself thus makes the procedure of teaching the key more difficult.

Below, the invention is illustrated in more detail by means of a drawing of one embodiment:

A shows a control device which is fixed in place in the vehicle and permanently supplied with electricity. Three key devices, B1, B2, B3, which are issued to the owner at the time of vehicle handover are allocated to the control device A. A forth key, B4, represented by a dashed line, is shown, whose function is explained below.

The keys B1 to B3 handed over to the lawful user of the vehicle are at first "neutral". Prior to its first use, each of the keys B1, B2, B3 must be "taught" to interact with the control device A. This means that a secret code present in the control device A is transferred to the key B1 to B3 so that as a result this key then emits encoded user information according to the secret code to the control device which in turn recognises this key as authorised. Teaching of the key B1, B2, B3 takes place in that at first a so-called PIN code which corresponds to the PIN code in the control device A is entered into the respective key. Subsequently, by contact between key B1 to B3 and control device A, the secret code is transferred so that the respective key(s) is/are taught.

In the device according to the invention there is another memory, M, in the control device A, in which every time a key B1, B2, B3 is taught, its numeric value is increased. At the same time keys B1 to B3 also comprise further memory means M1, M2, M3 which are adjusted to the value present in the further memory M each time the respective key is in contact with the control device.

If for example at first only key B1 is taught, keys B2, B3 remain in neutral function and the value of the further memory M of the control device A equals 1. For each further key taught, the memory value in memory M increases by 1. If for example key B1 is not used for an extended period and during this period keys B2 and B3 are taught, then after subsequent use of key B1 the further memory M1 in key B1 is increased to the value 3, as soon as key B1 makes contact again with the control device A.

Thus the current status of the number of taught keys can always be detected from at least one of the keys B1 to B3.

If for example, at a later stage a further key B4, (represented by dashed lines) is taught, then the value in the further memory M of the control device A is increased to 4 and also, accordingly, during subsequent contact with one of the keys B1 to B3, their memories M1, M2, M3 are increased to the value 4.

If subsequently, the vehicle is reported stolen, whereby the thief has key B4 available for operating the vehicle, then from the memory values of the further memories M1, M2, M3 of the key-set comprising keys B1 to B3, handed over to the insurer, it can be seen that a further key has been taught.

This shows that the vehicle theft has merely been feigned.

We claim:

1. A device for checking the user authorisation for access control devices, in particular locking devices for vehicles, comprising:

a control device (A) on the access side with a memory means for a secret code;

a number of key devices (B1 ... B$n$) on the user side, each key device comprising a transponder (T1 ... T$n$) in which the relevant secret code for the respective key device (B1 ... B$n$) is stored; and comparison means (V) in the control device (A) for determining the authorisation required for releasing the access device, in such a way that the information emitted by the respective transponder (T1 ... T$n$) in each case is compared to preset information, fixed by the secret code, in the control device, characterized in that (a) the relevant secret code for the particular key device (B1 ... B$n$) is stored, by learning it from the control device (A);

(b) the information emitted by the respective transponder (T1 ... T$n$)—which is compared by the comparison means (V) in the control device (A) with the preset information fixed in the control device (A), so as to determine the authorisation required for releasing the access device—comprises user code information encoded according to the taught secret code;

(c) the control device (A) comprises a further memory means (M) in which the number of the key devices (B1 ... B$n$) taught by the control device (A) is stored; and (d) the key devices (B1 ... B$n$) comprise further memory means (M1 ... M$n$) into which the actual memory value of the further controller memory means (M) in the control device (A) is taken over at each contact between the respective key device (B1 ... B$n$) and the control device (A).

2. A device according to claim 1, characterized in that the further memory means (M) in the control device (A) for determining the number of key devices (B1 ... B$n$) taught by the control device (A) is an increase-only counter.

3. A device according to claim 1, characterized in that PIN codes can be allocated to the control device (A) and to the key devices (B1 ... B$n$) in such a way that it is only possible to set the further memory means (M) in the control device (A) if the PIN code entered in the key device (B1 ... B$n$) agrees with the PIN code stored in the control device (A).

4. A device according to claim 1, characterized in that coupling between the control device (A) and one of the key devices (B1 ... B$n$) is by galvanic means, in particular in the form of a chip card.

5. A device according to claim 1, characterized in that coupling between the control device (A) and one of the key devices (B1 ... B$n$) is by capacitive and/or by inductive means.

6. A device according to claim 1, characterized in that corresponding secret codes are present for all key devices (B1 ... B$n$).

* * * * *